Oct. 20, 1953   J. C. HEINTZ, JR   2,655,975
APPARATUS AND METHOD FOR ADHESIVELY BONDING
FRICTION LINING TO BRAKE SHOES
Filed Nov. 23, 1949   2 Sheets-Sheet 1
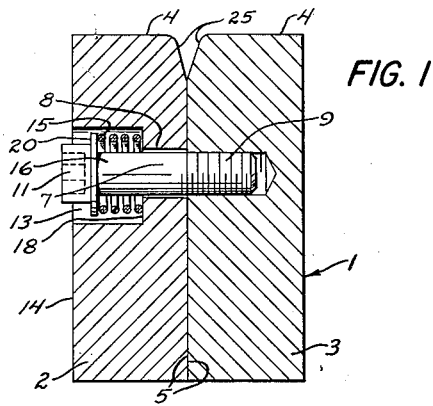
FIG. 1
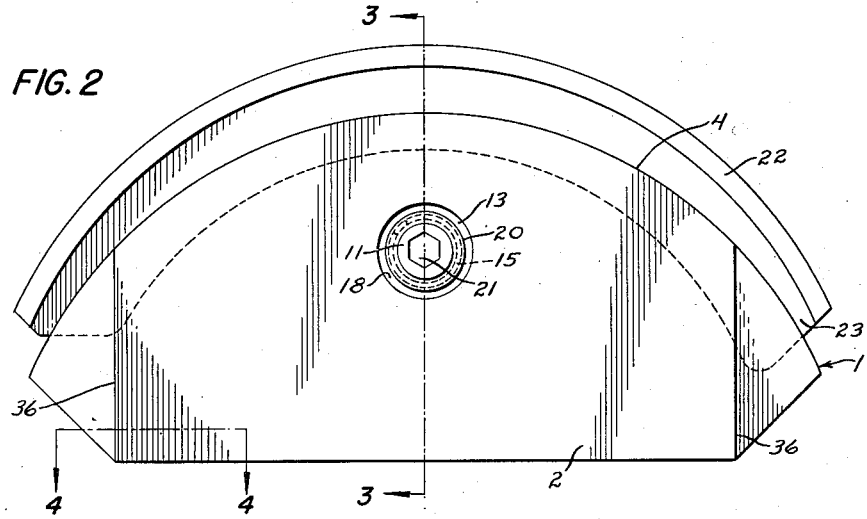
FIG. 2
FIG. 3
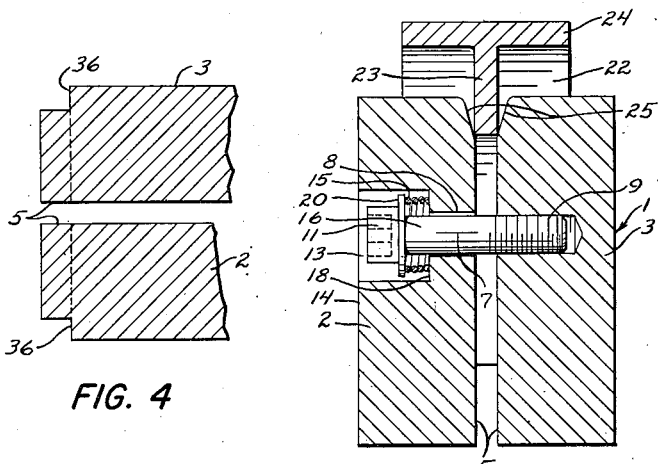
FIG. 4
INVENTOR.
JAMES C. HEINTZ, JR.
BY
Gordon C Meule
ATTORNEY Oct. 20, 1953  J. C. HEINTZ, JR  2,655,975
APPARATUS AND METHOD FOR ADHESIVELY BONDING
FRICTION LINING TO BRAKE SHOES
Filed Nov. 23, 1949  2 Sheets-Sheet 2

INVENTOR.
BY JAMES C. HEINTZ, JR.
ATTORNEY

Patented Oct. 20, 1953

2,655,975

UNITED STATES PATENT OFFICE 2,655,975

APPARATUS AND METHOD FOR ADHESIVELY BONDING FRICTION LINING TO BRAKE SHOES

James C. Heintz, Jr., Lakewood, Ohio

Application November 23, 1949, Serial No. 129,119

6 Claims. (Cl. 154—1)

This invention relates to adhesively bonding friction lining to a brake shoe. It includes a method of forming an improved bond between the lining and the shoe, and an improved mandrel for carrying out the method.

In lining a brake shoe, the fresh friction lining is placed on a convexly curved surface of the shoe over a layer of thermosetting adhesive. Pressure is applied to the lining while heat is applied to set or cure the adhesive and bond the lining to the shoe.

The heat is ordinarily supplied from a mandrel on which the shoe rests. For brake shoes having one or more webs extending perpendicularly from a curved flange to which the lining is bonded, a mandrel is used one surface of which is curved to more or less conform to the undersurface of the flange, and this surface is divided to receive the one or more webs. The heat for softening and curing the adhesive is conducted from the curved surface of the mandrel to the undersurface of the flange, and thence through the flange to the adhesive. This is not efficient because the undersurface of the flange does not make good contact with the curved surface of the mandrel. This may be due to several causes such as the fact that the undersurface of the flange is ordinarily rough, and the curvature of the mandrel may not be exactly the same as that of the flange. As a consequence, certain portions of the flange are heated more quickly, and to a higher temperature than others. This uneven heating causes the adhesive to be cured irregularly, and the bond is not uniform.

According to this invention, the surface of the shoe is heated more quickly and uniformly, and a more uniform and stronger bond is formed between the lining and shoe. This is accomplished by maintaining heated walls of the mandrel in pressure contact with the sides of the web, and thus transferring additional heat from the mandrel to the web and thence to the flange and the adhesive.

To accomplish this there are one or more divisions of the mandrel which are held together by springs, and the webs of the brake shoes are inserted between these divisions. The sides of the webs are customarily machined, and the walls of the mandrel are pressed by the spring into flat contact with them. Heat is efficiently transferred from the mandrel to the brake shoe in this manner uniformly through the length of the web, and this, in addition to the heat transferred from the curved surface of the mandrel to the undersurface of the flange, quickly brings the brake shoe to temperature; and the uniform heating produces a uniformly strong bond.

The invention will be further described with reference to the drawing, in which—

Fig. 1 is a vertical cross-sectional view of a preferred mandrel;

Fig. 2 is a side elevation of a mandrel with a brake shoe partially mounted thereon;

Fig. 3 is a cross-sectional view of the mandrel and brake shoe taken along the line 3—3 of Fig. 2;

Fig. 4 is a cross-sectional view of a portion of the mandrel taken along the line 4—4 of Fig. 2;

Figure 5:
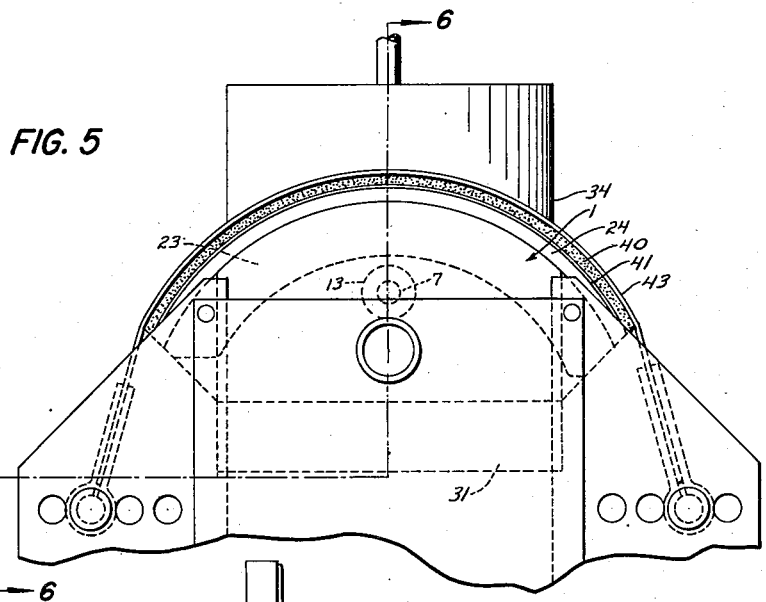
Fig. 5 is a front elevation of the upper portion of a preferred curing aparatus showing the mandrel and the shoe positioned therein.

The mandrel 1 is formed from two blocks or divisions, 2 and 3. Preferably they are aluminum, although any metal may be used which does not soften or melt at the temperature of use. Both blocks are substantially the same shape, and the upper surface 4 of each is curved to conform to the curvature of the flange of a brake shoe. Different mandrels will be used for brake shoes of different sizes. The inner face 5 of each block is smooth and flat, and when no brake shoe is engaged by the mandrel these faces are in contact with each other as in Fig. 1.

The two blocks are fastened together by bolt 7, the shank of which extends sideways through an opening 8 in the block 2 and the end 9 of which is threaded into the block 3. The head 11 of the bolt fits into a recess 13 which is counterbored into the face 14 of block 2 around the opening 8. A coil spring 15 is compressed around the portion 16 of the shank of the bolt which is in the recess 13. The spring is compressed between the bottom surface 18 of the recess and a washer 20 which is around the shank below the head 11 of the bolt. The head of the bolt is provided with an Allen type opening 21.

The brake shoe 22 is formed with the web 23 and flange 24. The inner walls 5 of the mandrel are beveled at 25 adjacent the curved surfaces 4. These beveled portions form a V-shaped groove which divides the curved surface of the mandrel. To engage a brake shoe with a mandrel its web 23 is pressed into this V-shaped groove, forcing the two divisions apart against the resistance of the spring 15. After the shoe is in position the inner walls 5 of the mandrel are pressed snugly against the sides of the web throughout its length. This large-surface contact throughout the length of the web provides efficient heat transfer between the mandrel and the shoe so that the shoe is heated rapidly and uniformly.

Figure 6:
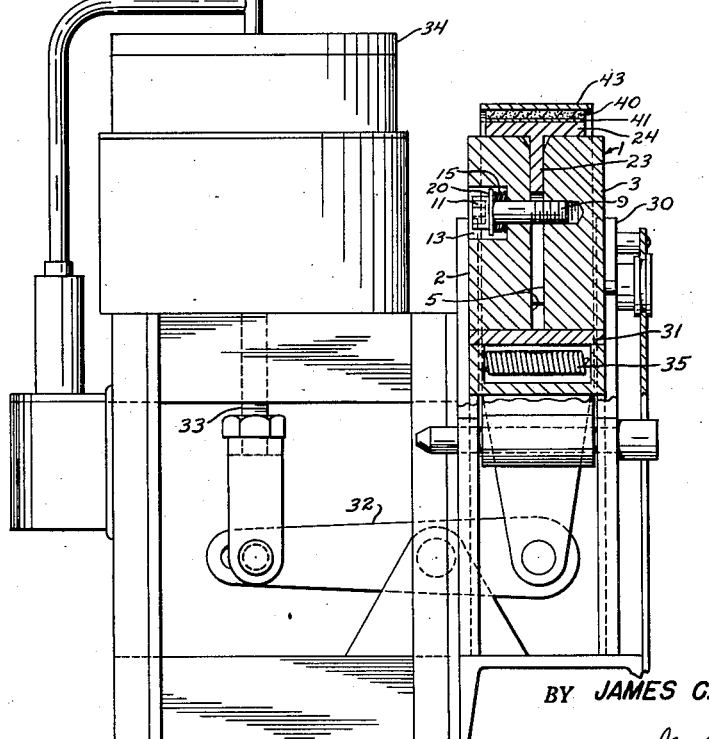
Fig. 6 is a side elevation of the curing apparatus showing portions thereof in cross section taken along the line 6—6 of Fig. 5.

The mandrels are adapted for use with conventional brake shoe lining bonding equipment. A preferred bonder is shown in Figs. 5 and 6 with a single mandrel of this invention mounted therein. Ordinarily a bonder will be designed to hold two mandrels so that two brake shoes may be relined simultaneously. This bonder is the subject of my co-pending application Serial No. 129,118, filed November 23, 1949. Generally, it includes a vertical, four-cornered guideway 30 in which a heater 31 is adapted to slide up and down. The heater is moved up in the guideway by lever 32, one end of which is connected to the piston 33 of a pressure cylinder 34. Heat is supplied from heating element 35. To simplify the description, but one mandrel is shown in Fig. 6. It is positioned on top of the heater and moves vertically in the guideway with it. The four corners of a mandrel which is to be used with this bonder usually will be provided with a stepped portion 36 (Fig. 4) so that the ends of the mandrel will project between the supports which form the guideway 30.

Usually the fresh lining 40 is placed over the adhesive 41 on the flange 24 of the shoe before the shoe is mounted on the mandrel. The mandrel, with the shoe on it, is forced upward in the guideway by the pressure cylinder into pressure contact with a flexible strap 43 which extends across the top of the guideway. The mandrel is heated from the heater 31 and heat is uniformly conducted from it through the web and flange of the brake shoe to the adhesive.

After the cure is completed the shoe is pulled off the mandrel and another shoe is engaged between the divisions of the mandrel in the manner described. The mandrel need not be removed from the equipment to remove a cured shoe.

The invention has been described with reference to an internal expanding-type brake shoe which has a T-shaped transverse cross section. Mandrels may be designed with a plurality of divisions to accommodate other types of brake shoes—for example, those having more than one web projecting from the flange—and to accommodate a plurality of brake shoes. The mandrels will be made in a number of sizes to accommodate brake shoes of various sizes. These and other modifications will be apparent to the man skilled in this art.

What I claim is:

1. A metal mandrel for a brake-shoe liner adapted to support therein a brake shoe formed of a flange and a web perpendicular thereto, which mandrel has a substantially flat bottom and comprises two mating divisions, the top surfaces of the two divisions being identically curved, the two halves of each curved surface being substantially symmetrical, said surfaces being adapted to contact the underside of the flange of the brake shoe and being adapted to support the same when the web of the brake shoe is located between the divisions, the mating divisions being solid and having efficient heat conductance from the bottom to the top surfaces thereof, the inner surfaces of the two divisions being adapted to abut one another with no overlapping adjacent the curved edges in order to permit the insertion of the web of the brake shoe, the divisions being joined by means with respect to which at least one of the divisions is slidable, and spring means pressing the divisions toward each other.

2. The mandrel of claim 1 in which the outer surfaces of the divisions are substantially perpendicular to the curved surfaces.

3. The mandrel of claim 1 in which in each division the edge joining the curved surface with the inner surface of the division is rounded to facilitate the insertion of the web of the brake shoe between the divisions.

4. The mandrel of claim 1 in which one end of the means joining the divisions is fastened in one of the divisions, and the spring means is located around the other end of said means joining the divisions, there being a stop at said last mentioned end against which the spring means is compressed when the divisions are separated.

5. A method for lining a brake shoe having a curved flange and a web projecting perpendicularly therefrom, which comprises placing thermosetting adhesive and fresh lining on the surface of the flange, and while pressing the lining to said surface pressing heated means against the opposite walls of the web and into flat contact therewith, so that heat is conducted therefrom to the web and thence through the flange to the adhesive, and continuing the pressure against the web until the adhesive is cured.

6. In attaching a lining to a brake shoe having a web extending perpendicularly from one surface thereof, using an adhesive to unite the lining to the shoe, the step which comprises heating the adhesive from the brake shoe while transferring heat to the web by pressing heated surfaces of a mandrel against opposite surfaces of the web.

JAMES C. HEINTZ, Jr.

References Cited in the file of this patent

UNITED STATES PATENTS

| Number | Name | Date |
| --- | --- | --- |
| 25,695 | Warner | Oct. 4, 1859 |
| 344,752 | Spitzer | June 29, 1886 |
| 488,058 | Breed | Dec. 13, 1892 |
| 1,416,773 | Barbour et al. | May 23, 1922 |
| 2,067,086 | Hoffman | Jan. 5, 1937 |
| 2,319,377 | Wallace et al. | May 18, 1943 |
| 2,358,483 | Tilden | Sept. 19, 1944 |
| 2,476,588 | Dreher | July 19, 1949 |
| 2,489,496 | O'Brien | Nov. 29, 1949 |

FOREIGN PATENTS

| Number | Country | Date |
| --- | --- | --- |
| 320,534 | Great Britain | Oct. 17, 1929 |